United States Patent [19]
Thornton

[11] Patent Number: 5,615,638
[45] Date of Patent: Apr. 1, 1997

[54] CAT LITTER COLLECTION DEVICE

[76] Inventor: Billy I. Thornton, R.R. 2, Box 106, Rushville, Ill. 62681

[21] Appl. No.: 419,197
[22] Filed: Apr. 10, 1995
[51] Int. Cl.$^6$ .................................................. A01K 1/035
[52] U.S. Cl. .......................................... 119/165; 119/706
[58] Field of Search .................................. 119/165, 166, 119/167, 168, 169, 170, 162, 706, 161, 462, 479, 484

[56] References Cited

U.S. PATENT DOCUMENTS

| | | | |
|---|---|---|---|
| 3,688,741 | 9/1972 | Thompson et al. | 119/165 |
| 3,990,397 | 11/1976 | Lowe, Jr. | |
| 4,271,544 | 6/1981 | Hammond. | |
| 4,335,679 | 6/1982 | Carlin | 119/165 |
| 4,766,845 | 8/1988 | Bavas | 119/165 |
| 5,042,430 | 8/1991 | Casmira. | |
| 5,092,270 | 3/1992 | Simons et al. | 119/165 |
| 5,195,457 | 3/1993 | Namanny | 119/165 |
| 5,329,878 | 7/1994 | McCauley. | |
| 5,388,550 | 2/1995 | Noble | 119/165 |

FOREIGN PATENT DOCUMENTS 227085  5/1943  Switzerland .......................... 119/165

*Primary Examiner*—Todd E. Manahan
*Attorney, Agent, or Firm*—Michael I. Kroll

[57] ABSTRACT

An improved cat litter collection device comprising a base unit having an open top, whereby the base unit sits upon a flat horizontal surface. A litter pan fits into the open top of the base unit. A cat can stand upon the base unit and deposit urine and feces directly into the litter pan without having to step into the litter pan. This prevents the cat from tracking unwanted litter and feces residue to other areas that are remote from the base unit.

1 Claim, 3 Drawing Sheets

CAT LITTER COLLECTION DEVICE

BACKGROUND OF THE INVENTION

1. Field of the Invention

The instant invention relates generally to animal litter boxes and more specifically it relates to an improved cat littler collection device.

2. Description of the Prior Art

Numerous animal litter boxes have been provided in prior art. For example, U.S. Pat. Nos. 3,990,397 to Lowe Jr., 4,271,544 to Hammond; 5,042,430 to Casmira and 5,329,878 to McCauley all are illustrative of such prior art. While these units may be suitable for the particular purpose to which they address, they would not be as suitable for the purposes of the present invention as heretofore described.

LOWE JR., HENRY E.

SANITARY PET BOX STRUCTURE

U.S. Pat. No. 3,990,397

A sanitary pet box structure having a container with a space therein for holding feces receiving material. A pet support section is adapted to seat on the container and has an elongated opening disposed over the space for the material. Along each side of the opening is a relatively flat area for supporting the respective front and rear paws of the pet, with said opening extending longitudinally with respect to the pet's body. The unit preferably has inwardly and downwardly sloping sides, so that the pet is forced to use the areas along each side of the elongated opening for the support of its paws and body. The support unit normally is used in conjunction with a container; however, it may be, in some instances, used in connection with a conventional toilet or commode.

HAMMOND, LARRY R.

ANIMAL COMMODE

U.S. Pat. No. 4,271,544

A commode for animals comprising a base member having an opening formed therein. The opening is surrounded by a box-like enclosure open at the top. The portion of the base interior to the enclosure is sloped downwardly toward the opening to aid an animal in correctly positioning itself over the slot. A part of the base, exterior to the enclosure, forms a platform which may be covered with a grass-like material. The opening may further include a mechanically operated trapdoor actuated by the weight of an animal positioning itself within the enclosure. The commode is mounted over a separate waste receiving tray or receptacle preferably containing an aqueous solution of a waste digesting-deodorizing chemical. It is also contemplated that the commode be removably mounted on a conventional toilet.

CASMIRA, STEPHEN

LITTER COLLECTION APPARATUS AND METHOD

U.S. Pat. No. 5,042,430

A litter collection apparatus in combination with a litter container and method for collecting litter material employing the litter collection apparatus. A tray is for attachment to the litter container. A hopper body has inclined walls defining a base within the hopper body to receive litter material. The tray is characterized by an opening for receiving the litter material. A grate is adapted to permit litter material to drop downwardly and inwardly in the hopper body and to provide animal access. The tray is attached to the hopper body by brackets for manual movement to tilt the hopper body between a litter receiving position and to a litter discharging position. A method for collecting litter material dropped by an animal includes providing litter material in a container. Attaching a collecting tray to the container characterized with an opening. A grate for providing a platform for animals and for passing litter material into the collecting tray. The collecting tray being positioned adjacent the container and extending outwardly to provide a platform for use by animals.

McMAULEY, RHONDA R.

LITTER CONTAINER HAVING INTERNAL AND EXTERNAL ACCESS RAMPS

U.S. Pat. No. 5,329,878

A litter container assembly particularly suited for accommodating a pot belly pig includes a litter container defining an enclosed area for containing a quantity of animal litter and having a sidewall with an opening formed therein. An inclined ramp structure is attached to the sidewall adjacent to the opening therein and extends therefrom, so as to define an entry and exit which leads into and from the enclosed area of the litter container. The ramp structure includes a first ramp inside the container and a second ramp outside the container.

SUMMARY OF THE INVENTION

A primary object of the present invention is to provide an improved cat litter collection device that will overcome the shortcomings of the prior art devices.

Another object is to provide an improved cat litter collection device that consists of a base unit supporting a litter pan, which will allow a cat to stand upon the base unit and deposit urine and feces directly into the litter pan, thereby preventing the cat from tracking unwanted litter and feces residue to other areas.

An additional object is to provide an improved cat litter collection device, in which the base unit is covered with carpet to help remove pieces of litter that may be stuck on a paw of the cat that is used to cover urine and feces within the litter pan.

A further object is to provide an improved cat litter collection device that is simple and easy to use.

A still further object is to provide an improved cat litter collection device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
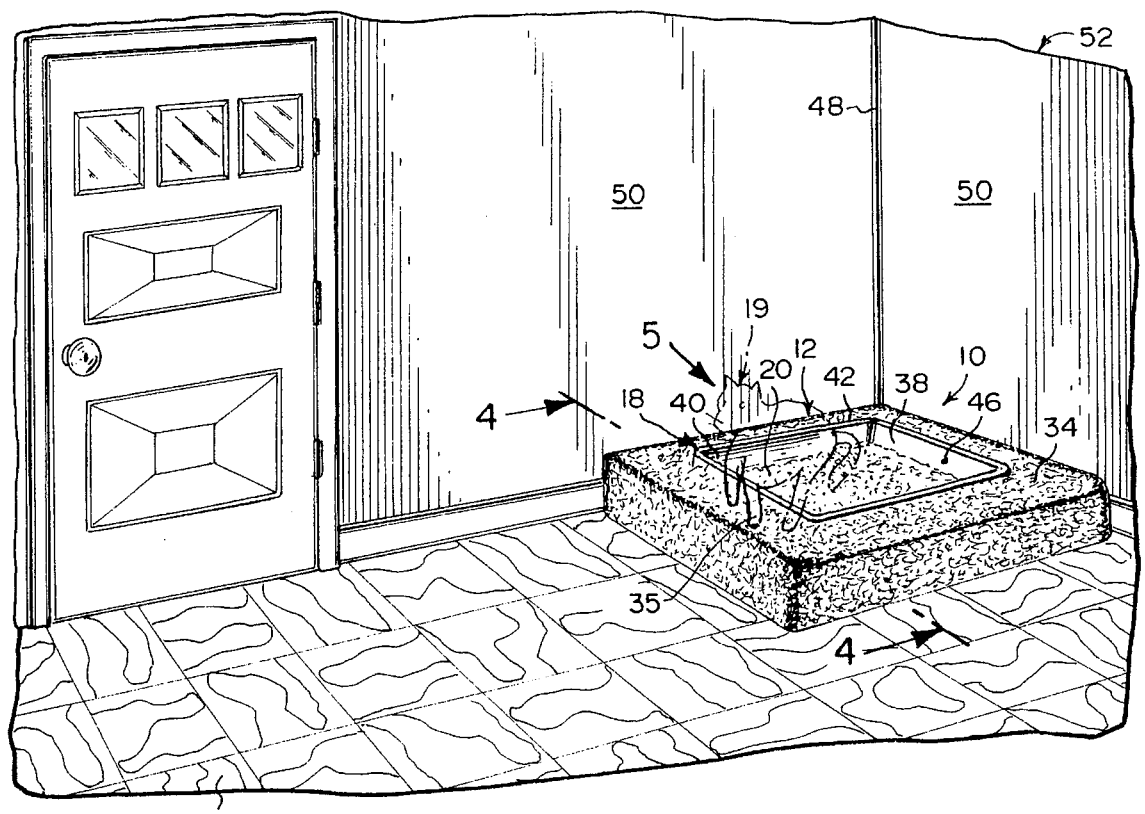
FIG. 1 is a perspective view of the instant invention placed upon a floor in a corner of a room.

Turning now descriptively to the drawings, in which similar reference characters denote similar elements throughout the several views, FIGS. 1 through 6 illustrate an improved cat litter collection device 10, comprising a base unit 12 having an open top 14, whereby the base unit 12 sits upon a flat horizontal surface 16. A litter pan 18 fits into the open top 14 of the base unit 12. A cat 19 can stand upon the base unit 12 and deposit urine and feces directly into the litter pan 18 without having to step into the litter pan 18. This prevents the cat from tracking unwanted litter 20 and feces residue to other areas that are remote from the base unit 12.

The base unit 12 includes a platform 22 having the open top 14 therethrough. A framework 24 extends about the platform 22, for elevating the platform 22 above the flat horizontal surface 16. The open top 14 is off center on the platform 22, so as to form two wide segments 26 and two narrow segments 28 about the litter pan 18 for the cat 19 to stand upon.

The framework 24 consists of a pair of end walls 30 that are spaced apart and parallel. A pair of side walls 32 are also spaced apart and parallel and extend between the end walls 30.

Figure 6:
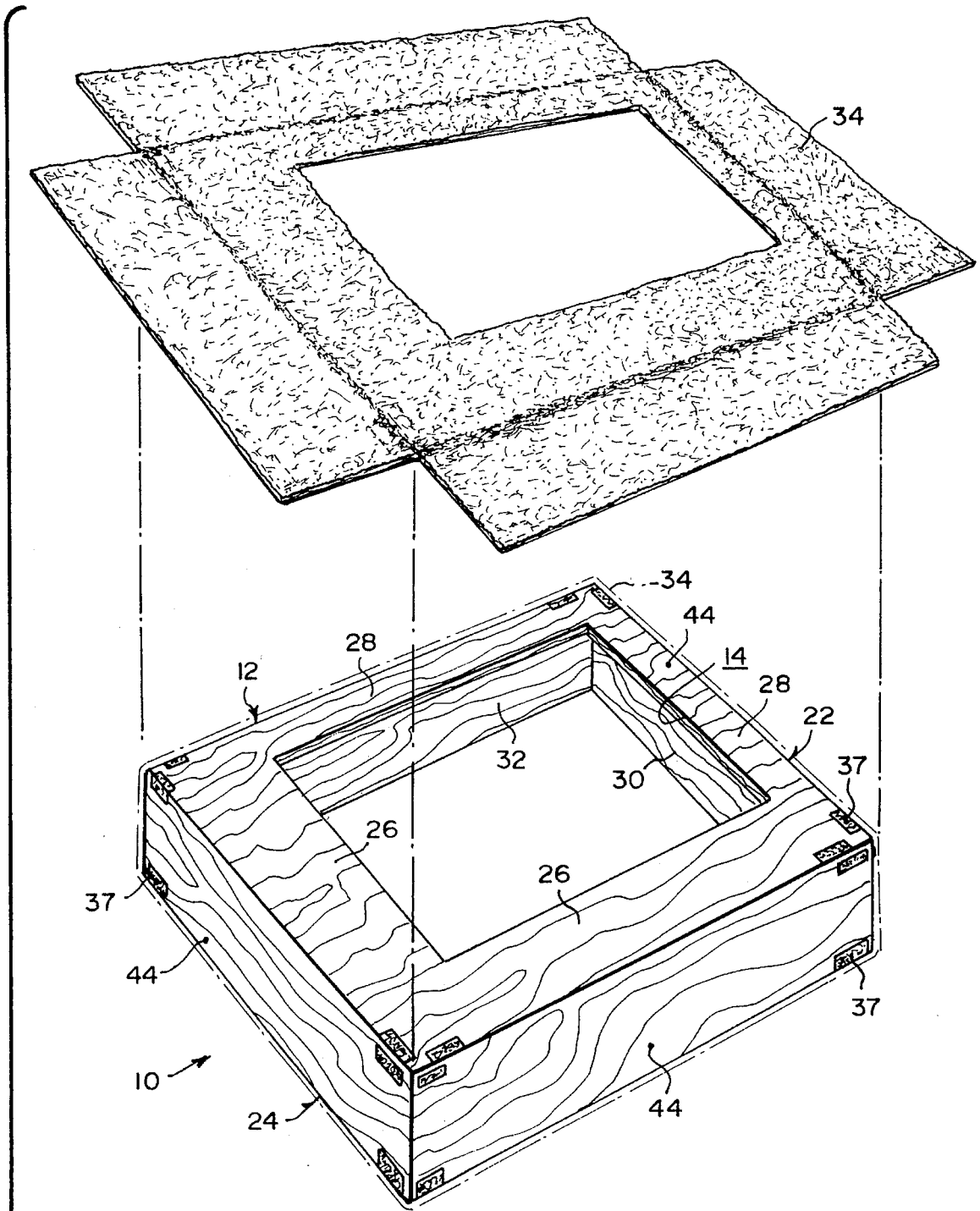
FIG. 6 is an exploded perspective view of the carpet from the frame unit.

The base unit 12 further includes a removable carpet 34 covering the platform 22, the end walls 30 and the side walls 32. The carpet 34 is more attractive to look at, is more appealing for the cat 19 to stand upon and will remove pieces of litter 20 that may be stuck on a paw 35 of the cat 19 that is used to cover the urine and feces within the litter pan 18. The carpet 34 can be retained to the base unit 12 by a plurality of fastener pads 37, as shown in FIG. 6. The carpet 34 can be lifted off the base unit 12, to be washed or changed when needed.

The litter pan 18 contains a bottom wall 36 and a pair of end walls 38. Each end wall 38 extends upwardly and outwardly at an angle from one end edge of the bottom wall 36. A pair of side walls 40 are also provided. Each side wall 40 extends upwardly and outwardly at an angle from one side edge of the bottom wall 36, so as to form a container for holding the litter 20 therein. The litter pan 18 further includes a peripheral lip 42, formed on the top edges of the end walls 38 and the side walls 40. The lip 42 will sit upon the edges of the open top 14 in the platform 22.

The platform 22 of the base unit 12 is fabricated out of a strong durable material 44. The end walls 30 and the side walls 32 of the framework 24 of the base unit 12 are also fabricated out of the strong durable material 44. The strong durable material 44 of the base unit 12 is wood. The strong durable material 44 can also be plastic, metal, cardboard and any other suitable materials.

The bottom wall 36, the end walls 38, the side walls 40 and the peripheral lip 42 of the litter pan 18 are integral and fabricated out of a strong durable material 46. The strong durable material 46 of the litter pan 18 is plastic. The strong durable material 46 can also be wood, metal, cardboard and any other suitable materials.

OPERATION OF THE INVENTION

Figure 2:
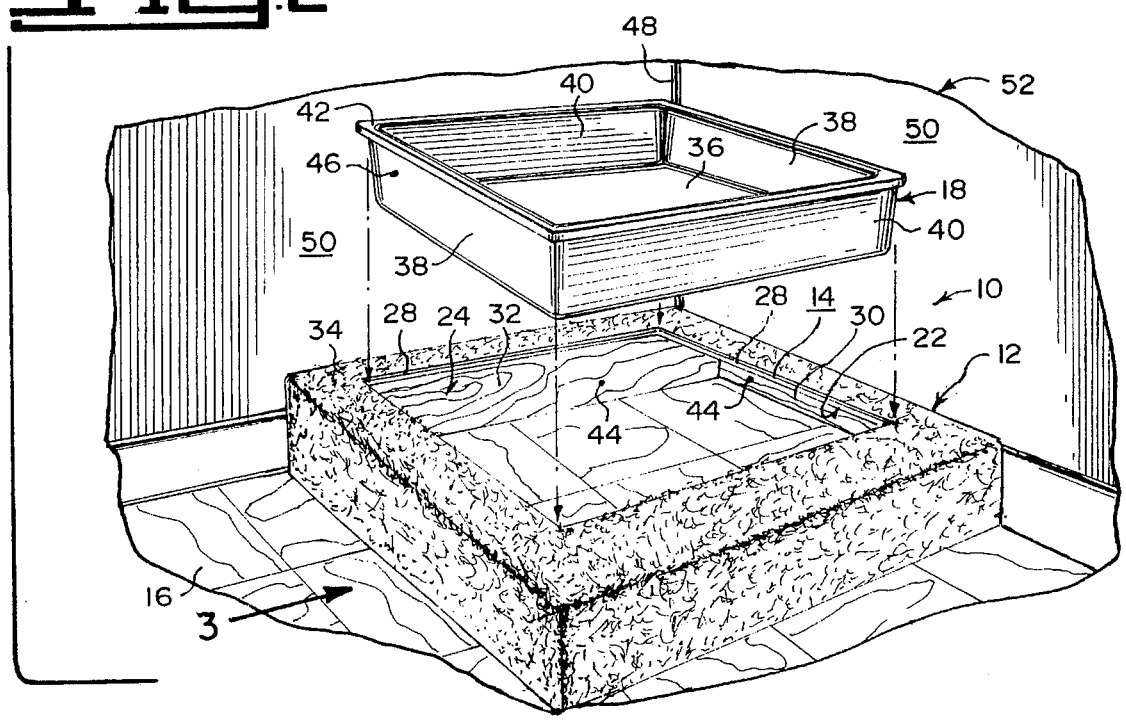
FIG. 2 is a perspective view similar to FIG. 1, with the litter pan exploded from the frame unit.
Figure 3:
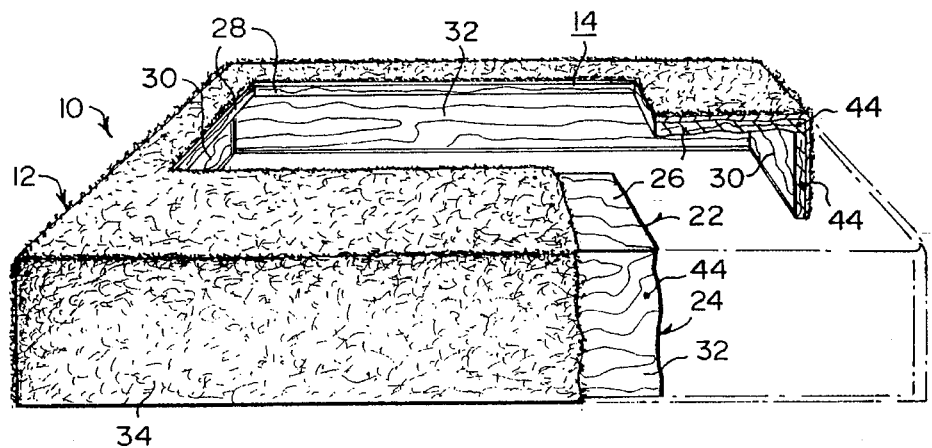
FIG. 3 is a perspective view of the frame unit taken in the direction of arrow 3 in FIG. 2, with parts broken away and in section.
Figure 4:
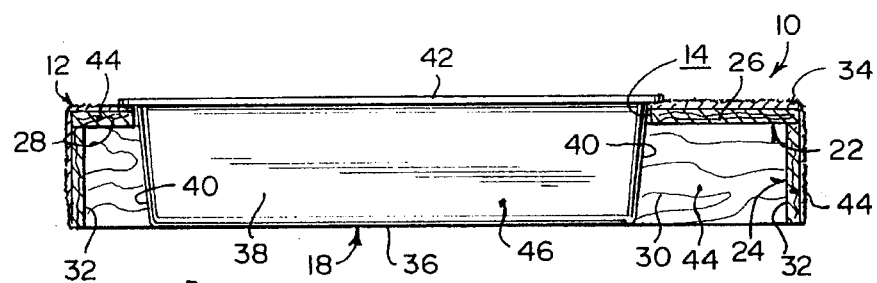
FIG. 4 is a cross sectional elevational view taken along line 4—4 in FIG. 1.
Figure 5:
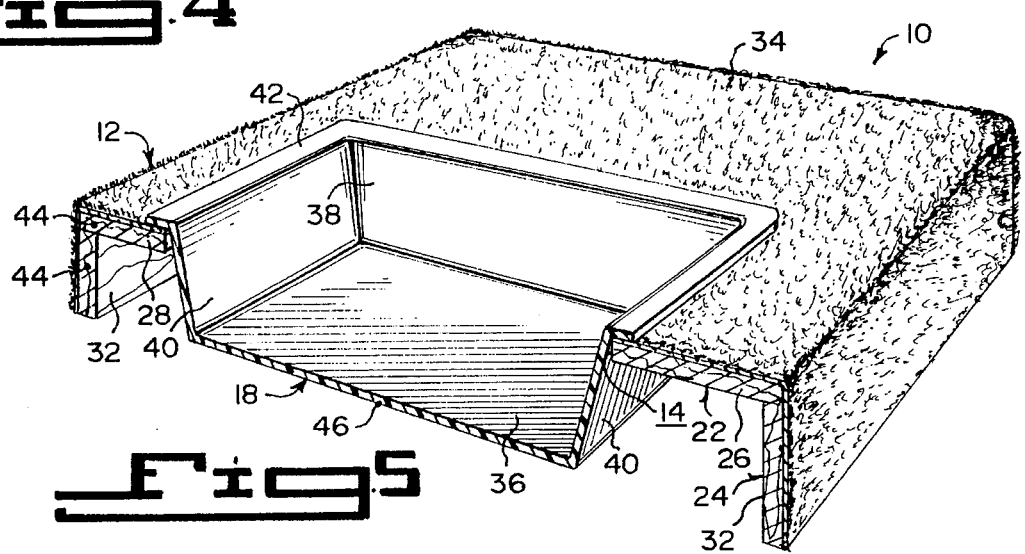
FIG. 5 is a cross sectional perspective view taken in the direction of arrow 5 in FIG. 1.

To use the improved cat litter collection device 10, the following steps should be taken:

1. Place the base unit 12 onto the flat horizontal surface 16, such as a floor.
2. Make sure that the two narrow segments 28 of the platform 22 are up against a corner 48 of the walls 50 in a building 52, as shown in FIGS. 1 and 2.
3. Insert the litter pan 18 into the open top 14, so that the peripheral lip 42 will sit upon the edges of the open top 14.
4. Put the litter 20 into the litter pan 18, whereby a cat 19 will stand upon the platform 22 of the base unit 12 and deposit it's urine and feces into the litter 20 within the litter pan 18.
5. Any pieces of litter 20 stuck on the cats paw 35 will be removed by the carpet 34 on the base unit 12.
6. Remove the litter pan 18 from the open top 14.
7. Dispose of the litter 20 with the cat urine and feces when needed.
8. Replace the litter pan 18 back into the open top 14.
9. Refill fresh litter 20 into the litter pan 18, so that it can be used again.

LIST OF REFERENCE NUMBERS 10 improved cat litter collection device
12 base unit of 10
14 open top in 12
16 flat horizontal surface (floor)
18 litter pan in 14
19 cat
20 litter in 18
22 platform of 12
24 framework of 12
26 wide segment of 22
28 narrow segment of 22
30 end wall of 24
32 side wall of 24
34 removable carpet over 22, 30, 32
36 bottom wall of 18

37 fastener pad between 12 and 34

38 end wall of 18

40 side wall of 18

42 peripheral lip of 18

44 strong durable material (wood) for 12

46 strong durable material (plastic) for 18

48 corner of 50

50 wall of 52

52 building

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved cat litter collection device comprising:

a) a base unit comprising a raised platform having an open top surrounded by said platform, said platform being supported along its periphery by vertical walls with said open top being off center on said platform so as to form two wide segments and two narrow segments of said platform about said litter pan for the cat to stand upon, said base unit being unenclosed to permit said cat to freely mount and leave said base unit;

b) a litter pan removable by lifting fitted into said open top of said base unit, so that a cat can stand upon said base unit and deposit urine and feces directly into said litter pan without having to step into said litter pan, thereby preventing the cat from tracking unwanted litter and feces residue to other areas that are remote from said base unit;

c) a removable carpet completely covering the wide and narrow segments and the outside surfaces of said vertical walls of said raised platform to remove pieces of litter that may be stuck on a paw of the cat, said pan having a peripheral lip sitting upon the edge of said open top; and d) a plurality of fastener pads on the outside surfaces of said platform and vertical walls for holding said removable carpet in place.

* * * * *